_United States Patent_ [19]

Aucktor et al.

[11] 4,116,020
[45] Sep. 26, 1978

[54] CONSTANT VELOCITY UNIVERSAL JOINT

[75] Inventors: Erich Aucktor, Offenbach am Main; Wolfgang Rubin, Hanau, both of Fed. Rep. of Germany

[73] Assignee: Löhr & Bromkamp GmbH, Offenbach am Main, Fed. Rep. of Germany

[21] Appl. No.: 688,831

[22] Filed: May 21, 1976

[30] Foreign Application Priority Data

May 22, 1975 [DE] Fed. Rep. of Germany ....... 2522670

[51] Int. Cl.² .............................................. F16D 3/30
[52] U.S. Cl. ...................................................... 64/21
[58] Field of Search ..................................... 64/21, 8, 7

[56] References Cited

U.S. PATENT DOCUMENTS

| | | | |
|---|---|---|---|
| 1,524,166 | 1/1925 | Weiss | 64/21 |
| 3,133,431 | 5/1964 | Zech | 64/21 |
| 3,362,192 | 1/1968 | Orain | 64/21 |
| 3,789,624 | 2/1974 | Camosso | 64/21 |
| 3,822,570 | 7/1974 | Fisher | 64/21 |

FOREIGN PATENT DOCUMENTS 2,252,827  5/1974  Fed. Rep. of Germany .............. 64/21

Primary Examiner—Benjamin W. Wyche
Assistant Examiner—R. C. Turner
Attorney, Agent, or Firm—Edmund M. Jaskiewicz

[57] ABSTRACT

A constant velocity universal joint comprises an outer joint element having a cavity therein and an inner joint element positioned within the cavity. A plurality of torque transmitting balls are positioned within pairs of opposed grooves formed in the opposing surfaces of the inner and outer joint elements with the grooves being positioned in meridial planes. A ball retaining cage is disposed between the joint elements and has an inner spherical surface coacting with the outer spherical surface of the inner joint member and an outer spherical surface co-acting with a spherical surface portion on the cavity surface of the outer joint element so that the balls are retained in a plane which bisects the angle between the joint elements. The cavity surface and/or the grooves in the cavity surface have a non-undercut configuration in an axial direction with respect to one end of the outer joint member and means are provided on an end of the outer joint element to maintain the cage in coacting relationship with the cavity spherical surface portion.

15 Claims, 9 Drawing Figures

CONSTANT VELOCITY UNIVERSAL JOINT

The present invention relates to a constant velocity universal joint, more particularly, to the non-undercut configuration of the cavity surface and/or the grooves in the outer joint element.

It has been known to provide a constant velocity universal joint having an outer joint element with a cavity or recess therein with the wall of the cavity having a plurality of grooves in meridial planes. An inner joint element within the cavity of the outer joint element has in its outer surface a number of grooves also in meridial planes and corresponding to the number of grooves in the outer joint element to define pairs of opposed grooves. A torque transmitting ball is jointly received in each pair of opposed grooves. A ball retaining cage is positioned between the joint elements so as to guide the balls. The cage has an outer spherical surface which is guided upon the cavity surface of the outer joint element and an inner spherical surface which is guided upon the spherical outer surface of the inner joint element so as to retain the balls in a plane which bisects the angle between the rotational axes of the inner and outer joint elements.

In such constant velocity universal joints as previously known, the outer joint element is generally in the form of a cup or cylinder closed at one end. The grooves in the outer joint element in which the balls are retained and the partial spherical surfaces on which the cage is guided are usually formed by suitable machining operations, such as cutting or grinding, wherein these operations are generally carried out by the introduction of a suitable tool into the open end of the joint element. The cage guiding surface on the outer joint element is generally of an undercut configuration when viewed from the open end of the joint element and this configuration necessitates relatively expensive and difficult machining operations.

In the German OS No. 2 252 827 the universal joint disclosed therein has the ball receiving grooves formed without undercut surfaces but the inner cavity upon which the ball cage is guided presents major manufacturing difficulties. This cavity can be shaped to the required configuration only by expensive machining operations such as turning, grinding or the like. A further disadvantage is that the outer joint element is formed in one piece together with the associated axle or spindle shaft which necessitates that both of these elements must be replaced whenever either one of them is significantly worn or damaged.

In another form of such a universal joint the balls are guided and controlled by the conical co-acting of oppositely disposed grooves. The cross-section of these grooves increases in the direction toward the interior of the joint which thus necessitates providing a supporting structure to prevent any dislocation of the balls. However, the grooves and the interior cavity of the outer joint element do have undercuts therein which makes their manufacture considerably more expensive.

It is therefore the principal object of the present invention to provide a novel and improved constant velocity universal joint.

It is another object of the present invention to provide such a universal joint wherein the cage guiding surface, the grooves in the outer and inner joint elements and the remaining structure of the joint components can be economically produced by non-cutting shaping processes and are simple in structure.

According to one aspect of the present invention a constant velocity universal joint may comprise an outer joint element having a cavity therein with a surface and a plurality of grooves in meridial planes in the cavity surface. An inner joint element is positioned within the cavity and has a spherical outer surface in which is formed a plurality of grooves in meridial planes. The grooves in the inner and outer joint elements are of the same number and these grooves are so disposed to define pairs of opposed grooves in which a ball is positioned in each pair of opposed grooves. Means are provided between the joint elements for retaining the balls and this means has an outer spherical surface and an inner spherical surface with the cavity surface of the outer joint element co-acting with the ball retaining means outer spherical surface and the inner joint element spherical outer surface co-acting with the ball retaining means inner spherical surface so as to retain the balls in a plane which bisects the angle between the joint elements. The cavity surface has a non-undercut configuration in an axial direction with respect to one end of the outer joint element and means are provided on the one end of the outer joint element for maintaining the ball retaining means in co-acting relationship with the cavity surface. The maintaining means comprise an additional cage supporting surface which is complementary to and an extension of the cage guiding surface on the outer joint element.

An advantage of the present invention is that the outer joint element can be manufactured in two pieces with one piece comprising a cylindrical member the inner face of which is provided with the ball grooves and a partial spherical cage guiding surface and an end part which is attached to one end of the cylindrical part to form a closed end wall of the outer joint member. The cylindrical member can thus be formed as a standardized component whereas the end part may have an axle or spindle shaft attached thereto having various dimensions and shapes for different conditions. Because of this two-piece manufacture of the outer joint element considerable economies can be achieved both with respect to material and to inventory costs since only a variety of end parts with attached shafts need be stocked. Overall production costs for the outer joint element are further reduced by enabling larger production lots of this member or in the case of mass production by greater production rates.

Another advantage is that the cylindrical part of the outer joint member and also the inner joint element can now be economically produced because the cage guiding surface and the ball track grooves can be formed by non-cutting plastic shaping processes, hot or cold flow pressing, precision forging and/or groove calibration processes.

A further advantage is that manufacturing tolerances can be compensated for in the dimensions of the two components for the outer joint element.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
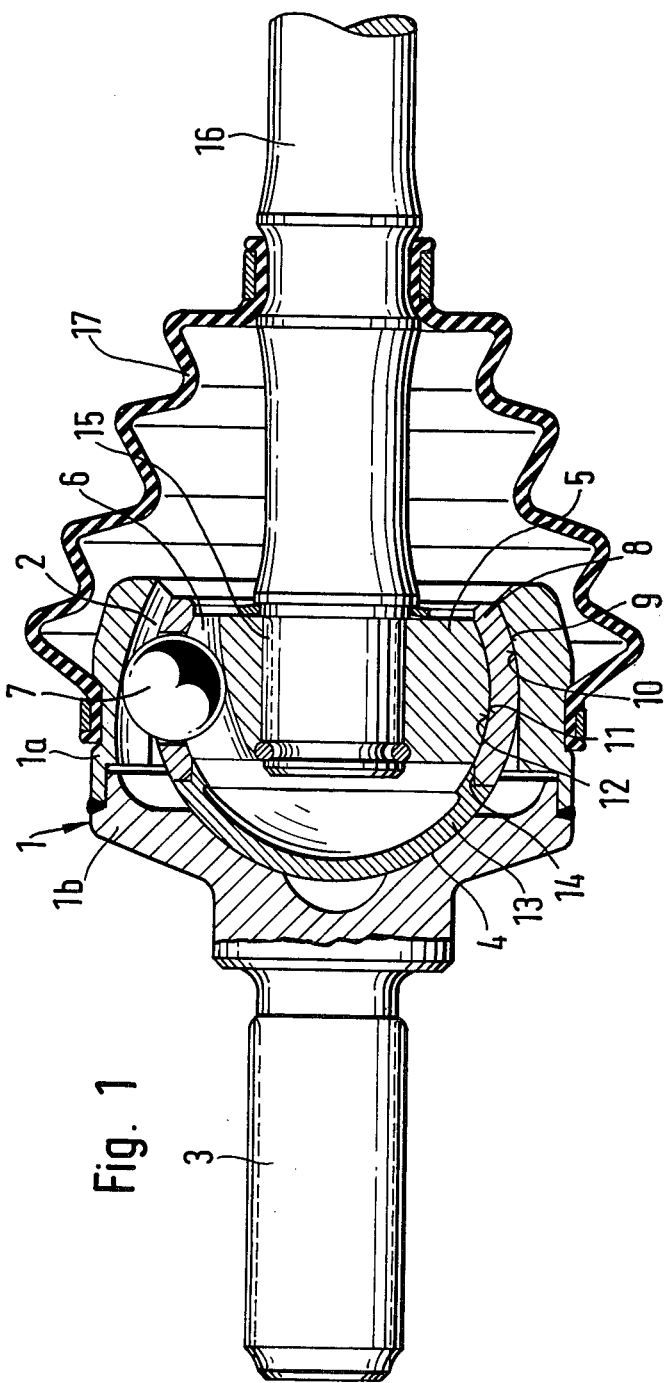
FIG. 1 is a longitudinal sectional view of a constant velocity universal joint according to the present invention having a non-undercut configuration in an axial direction of the outer joint element.
Figure 2:
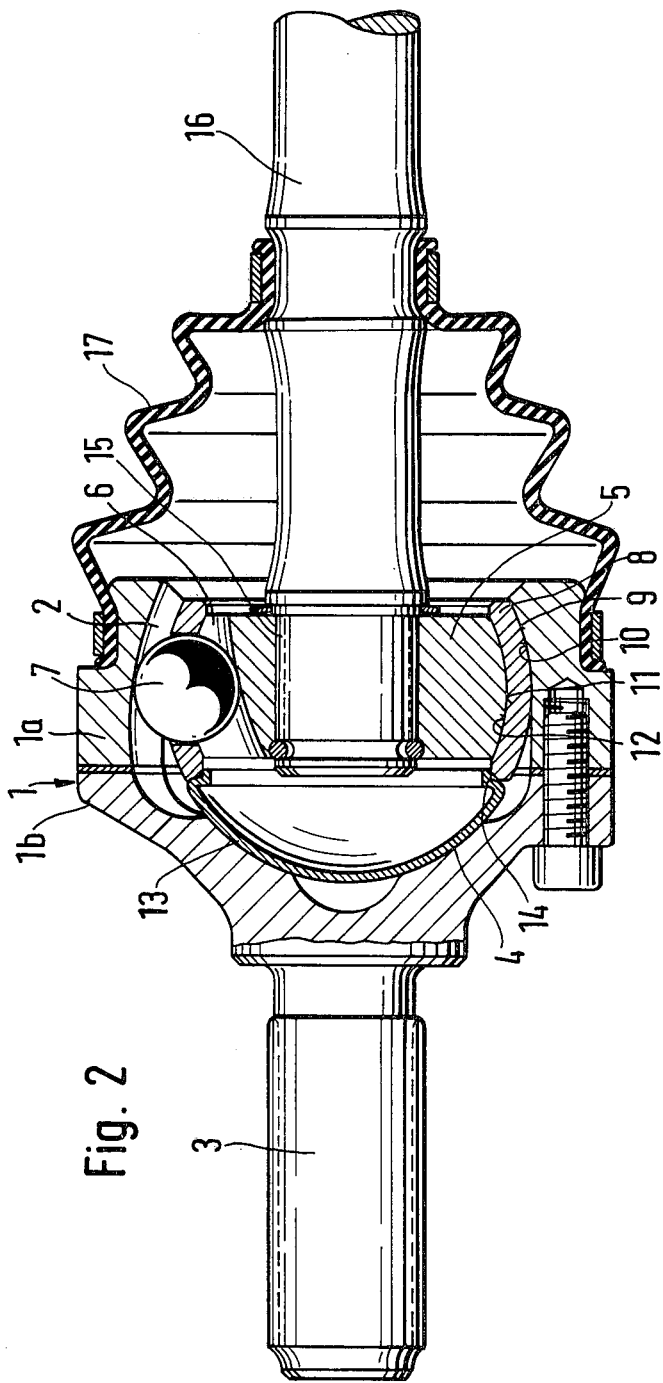
FIG. 2 is a view similar to that of FIG. 1 but showing a modification thereof wherein the two components of the outer joint element are bolted together.

In FIGS. 1 and 2 there is illustrated a constant velocity universal joint according to the present invention comprising an outer joint element 1 consisting of a cylindrical element 1a to which is connected an end part 1b by bolts, welding as shown in FIG. 1, or some other suitable fastening. The cylindrical part 1a is provided with a cavity or recess therein and in the surface of the cavity is formed a plurality of grooves 2 which are located in meridial planes.

The end part 1b has extending therefrom an axle or spindle shaft 3 and on its inner surface is provided with a guiding surface 4 facing toward the cylindrical part 1a. The guiding surface 4 is substantially concave. An inner joint element 5 is positioned within the cavity of the outer joint element 1 and is provided with a plurality of grooves 6 disposed in meridial planes in its outer spherical surface. The grooves 2 and 6 are positioned so as to form pairs of opposed grooves and torque transmitting balls 7 are each received in a pair of opposed grooves and retained in position by means of a cage 8 having a plurality of openings or seating recesses therein to guide and support the balls 7. The cage 8 has an inner spherical surface 12 which is guided upon a corresponding outer spherical surface 11 on the inner joint member 5. An outer spherical surface 10 on the cage 8 is guided upon a correspondingly shaped spherical surface 9 which is a portion of the cavity surface of the outer joint element 1.

According to the present invention, the cylindrical element 1a of the outer joint element has a non-undercut configuration in the axial direction with respect to the end of the cylindrical member which is connected to the end part 1b. According to the non-undercut configuration, the edges of the cavity in the cylindrical part 1a directed toward the end part 1b are parallel or may be divergent. The same non-undercut configuration may also be utilized in the grooves 2.

In order to support and guide cage 8 in the axial direction and to maintain the cage 8 in guiding or co-acting relationship with the spherical surface 9 on the inner joint element there is provided an intermediate element 13 which engages with the guide or supporting face 4 on the end part 1b. The element 13 complements and extends the outer spherical surface of the cage 8 and is provided with an axially extending lip 14 which is fitted into a corresponding shape on the end of the cage 8 so as to accurately and precisely guide the cage.

The element 13 also precludes any axial sliding displacement of the inner joint element 5 with respect to the outer joint element 1 and precisely aligns the balls 7 in the homokinetic plane which bisects the angle between the rotational axes of the inner and outer joint elements when the universal joint is bent.

The inner joint member 5 has a bore 15 therethrough provided with a tooth or splined cross-section to receive a correspondingly shaped end of a shaft 16. The interior of the universal joint is protected and sealed with respect to the outer atmosphere by means of a bellows type flexible boot 17 whose ends are clamped by clamping rings to the shaft 16 and outer joint element 1.

With respect to FIG. 1, the universal joint is assembled by initially pre-assembling the inner joint element 5, cage 8, balls 7 and guiding element 13 within the cylindrical part 1a. Upon completing this preassembly, the cylindrical part 1a is fitted upon the end part 1b and these parts are pushed together until the required clearance is obtained between the guiding element 13 and the supporting surface 4. The parts 1a and 1b are then firmly secured together by welding only after this positioning has been accomplished.

The modification of FIG. 2 is similar to the joint of FIG. 1 but the outer element parts 1a and 1b are secured together by bolts and the required clearance is established by the insertion of a proper thickness of annular spacing elements or washers between the engaging ends of the parts 1a and 1b.

Figure 3:
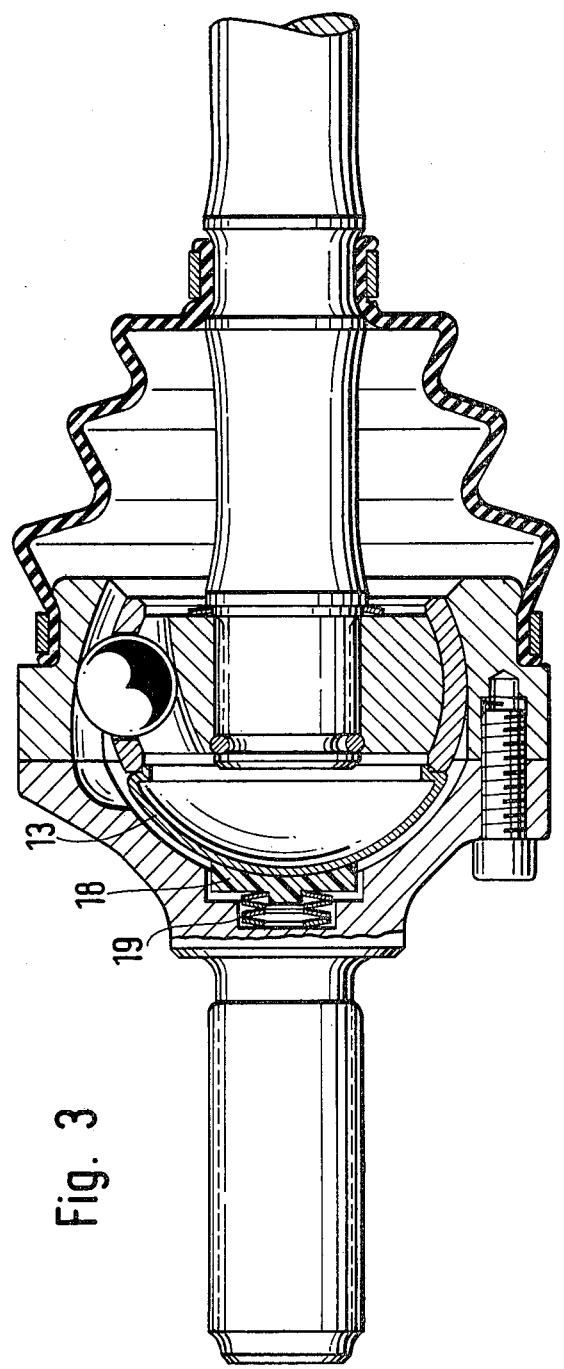
FIG. 3 is a view similar to that of FIG. 1 but showing a modification wherein the cage guiding means bears against a plastic disc supporting surface.

In the universal joint of FIG. 3, the guiding element 13 is supported on a layer 18 of a synthetic plastic material. The layer 18 comprises a disc of the plastic material which is supported upon a resilient mounting element 19 in order to provide for adjusting of the desired clearance as discussed above. In addition, the components 1a and 1b of the outer joint elements are bolted together as in the modification of FIG. 2.

Figure 4:
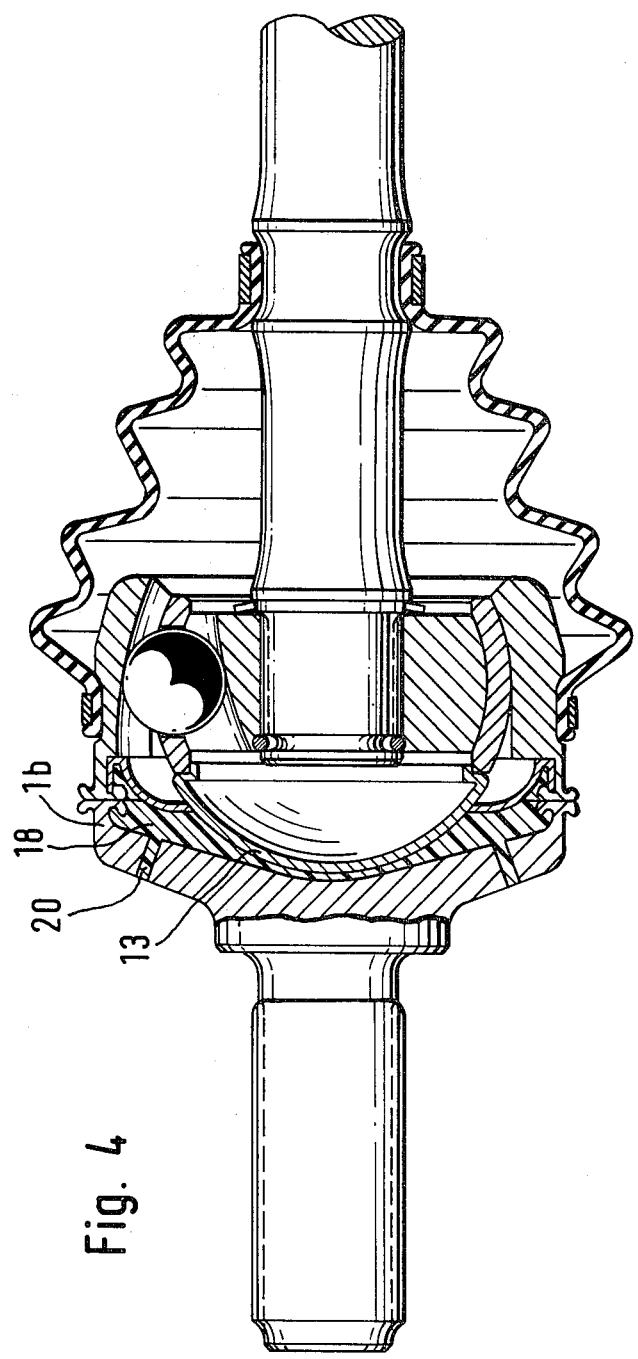
FIG. 4 is a view similar to that of FIG. 1 showing a modification wherein a plastic supporting surface is formed in situ.

The universal joint in FIG. 4 is also provided with a plastic layer or surface 18' for supporting the intermediate element 13. The plastic layer 18' is formed in situ by injecting the plastic when in a liquid state through at least one bore 20 after the universal joint has been completely assembled. The quantity of the plastic material which is so injected will depend upon the magnitude of the clearance desired between the intermediate element 13 and the end part 1b of the outer joint element. The abutting edges of the outer joint element components 1a and 1b are provided with radially extending flanges which are welded together.

Figure 5:
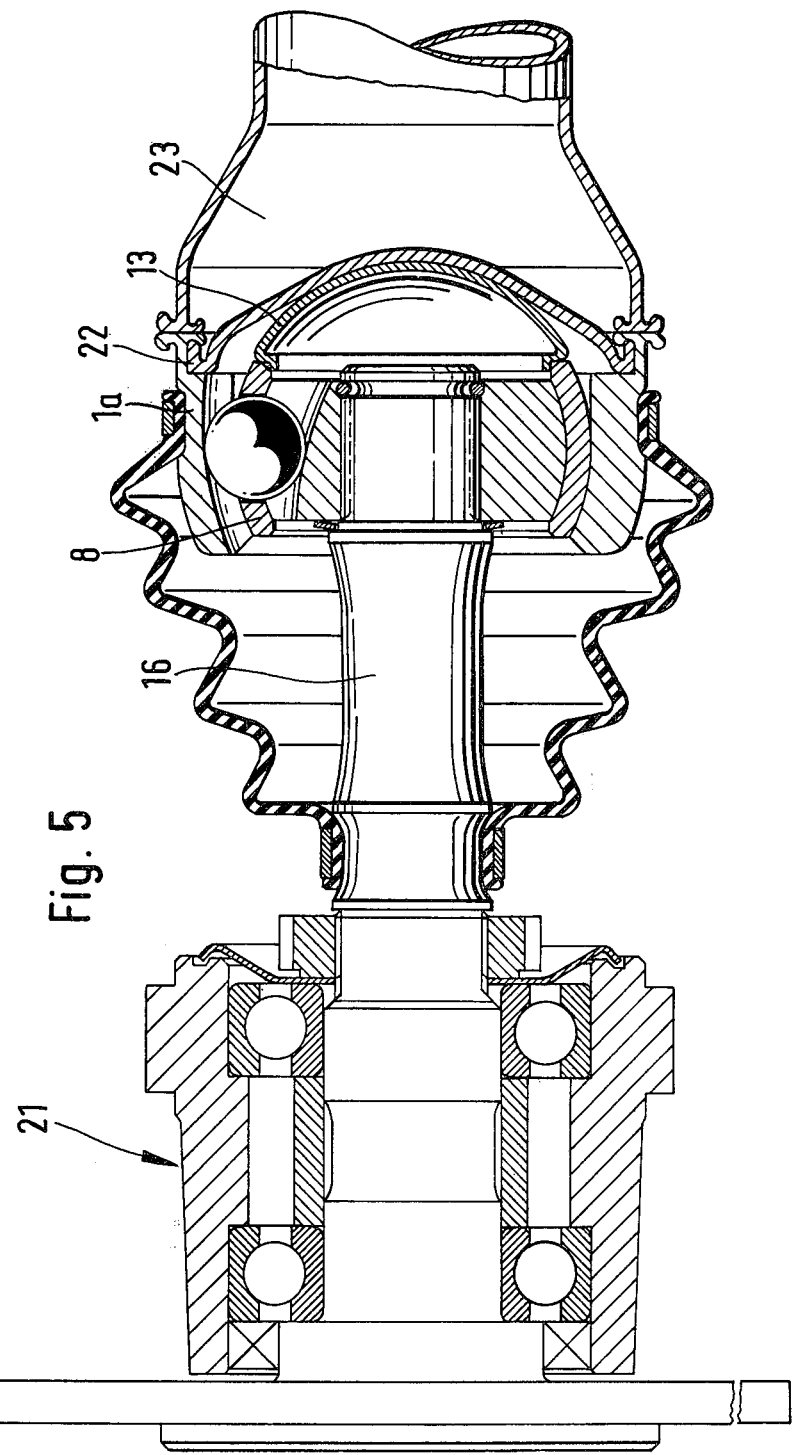
FIG. 5 is a view similar to that of FIG. 1 and showing a tubular shaft connection.

In FIG. 5, the cage 8 is guided axially by the intermediate element 13 on its edge which faces toward a tubular shaft 23 which is welded to the cylindrical part 1a of the outer joint element. The element 13 bears against a surface of a concave disc-like member 22 having an annular flange on its peripheral edge which is secured between a shoulder on the part 1a and the tubular shaft 23. The splined shaft 16 is connected with a wheel-bearing unit 21.

Figure 6:
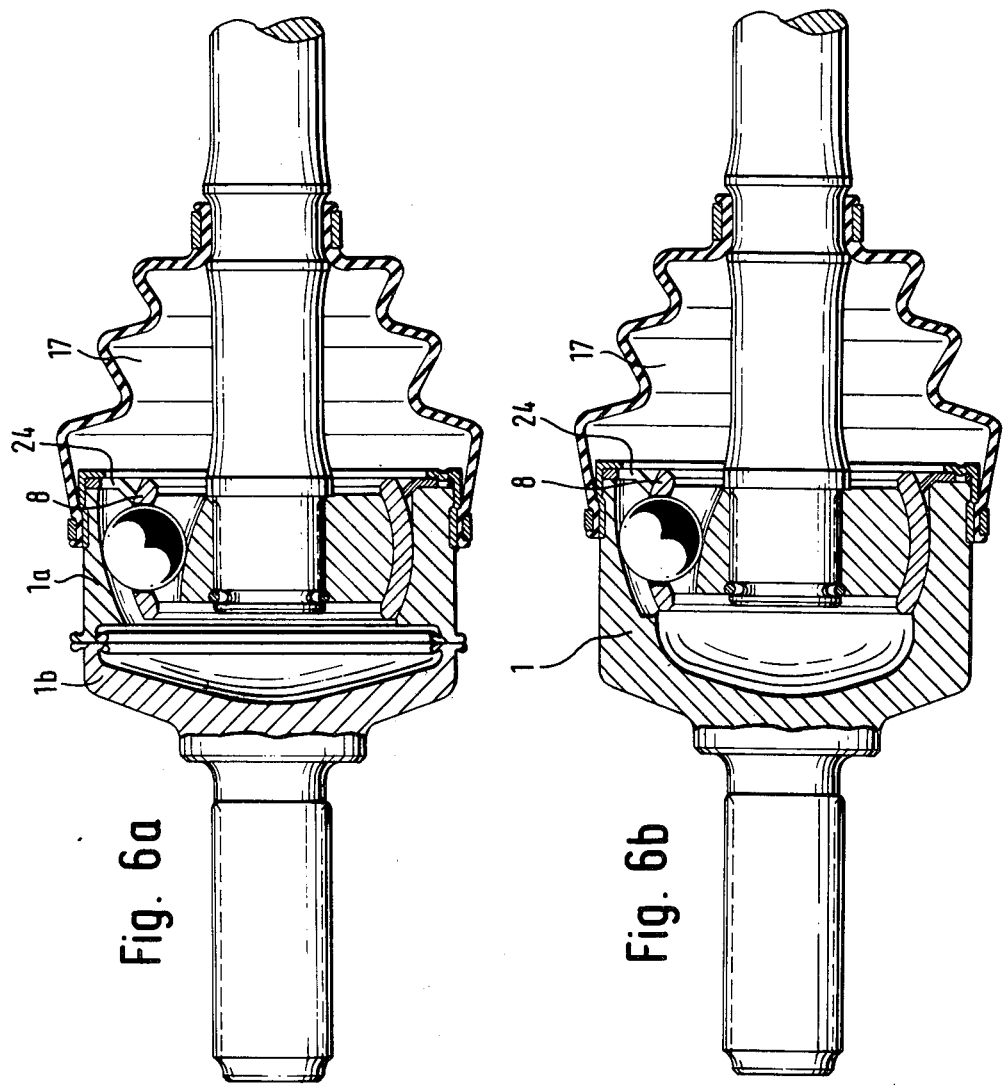
FIGS. 6a and 6b show a view similar to that of FIG. 1 but showing the supporting surface in the form of an annular member.

In FIG. 6, the non-undercut configuration of the outer joint member cavity is directed toward the side of the flexible protective booth 17. The cage 8 is supported and guided along the inner periphery of an annular member 24 which is connected either directly or through an intermediate structure with the component 1a of the outer joint member 1. This intermediate structure may also be used for securing one end of the protective boot 17. The universal joint of FIG. 6 may be fully mounted after fitting together the components 1a and 1b of the outer joint member 1. If the outer joint member 1 is made from a single piece so as to be unitary and integral, the joint is then mounted by an axially directed movement.

Figure 7:
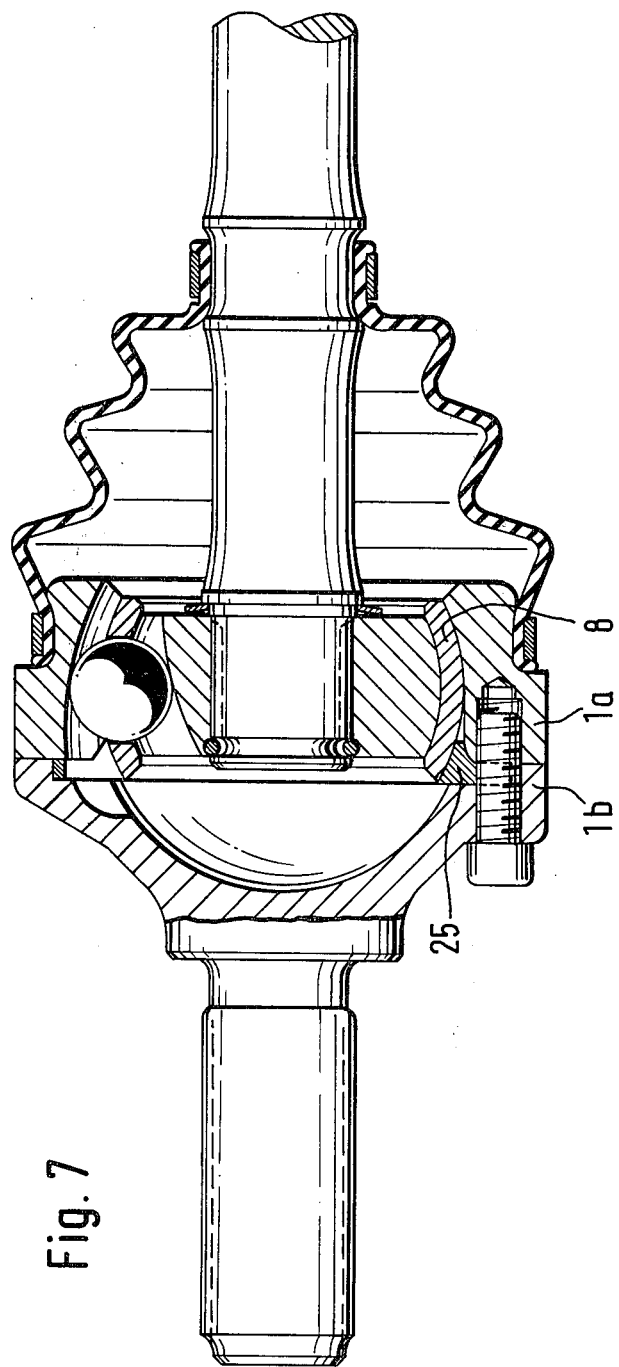
FIG. 7 is a view similar to that of FIG. 1 but showing another modification of the supporting surface in the form of an annular member; and, FIG. 8 is a view similar to that of FIG. 1 but showing a modification wherein the grooves and the cage guiding surface of the outer joint element have non-undercut configurations with respect to opposite axial directions.

The universal joint of FIG. 7 is similar in concept to the joint of FIGS. 1 and 2. The outer element components 1a and 1b are bolted together and there is provided a ring or annular member 25 whose outer peripheral edge portion is clamped between the abutting faces of the components 1a and 1b. The ring 24 has a surface which engages and supports the cage 8. This joint significantly facilitates a ready replacement of worn components. This is also true with the joints of FIGS. 2 and 3.

Figure 8:
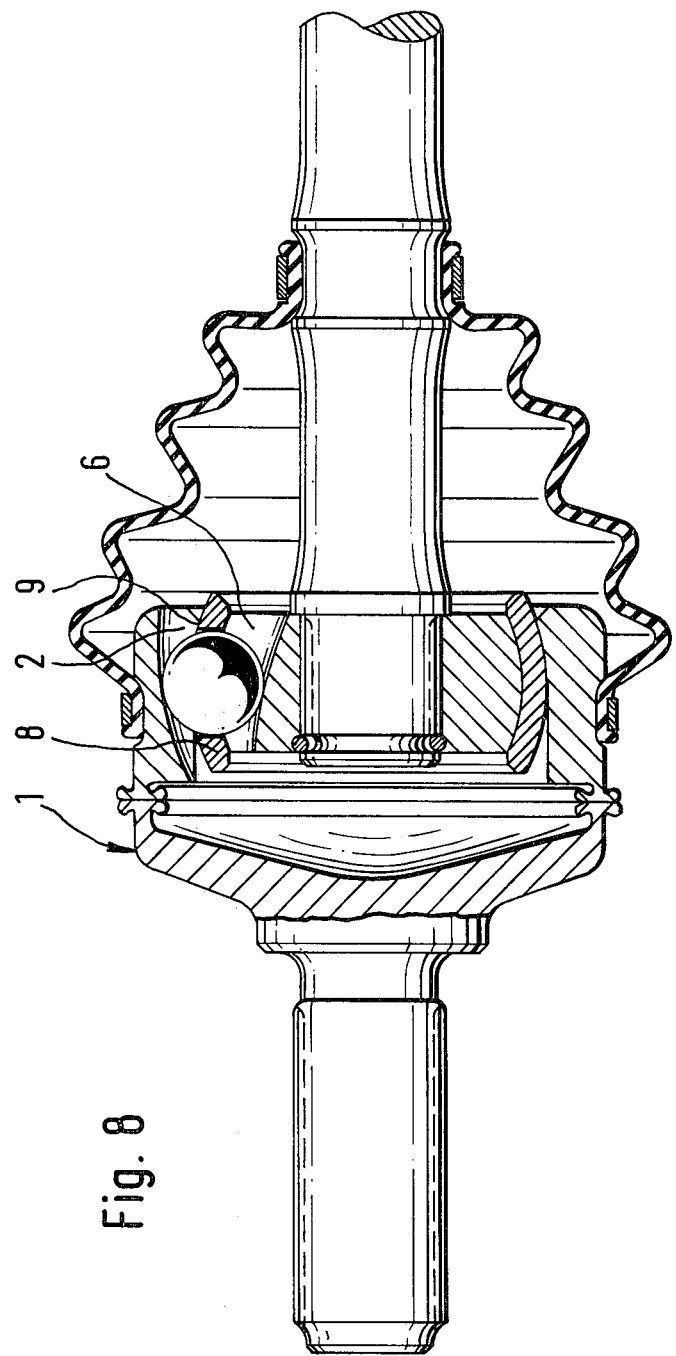

In the universal joint of FIG. 8, the non-undercut configurations of the outer element cavity and the grooves 2 are disposed in axially opposing directions. The cage 8 is supported on the partial spherical surface 9 on the cavity surface of the outer joint element 1 and this support precludes any axial displacement of the inner joint element with respect to the outer joint element since the openings between the grooves 2 and 6 of the outer and inner joint elements 1 and 5 are directed in a direction opposite to the non-undercut configuration of the cage guiding surface. As a result, axial displacement of the cage 8 with respect to the outer joint element 1 is prevented.

Thus it can be seen that the present invention discloses a constant velocity universal joint which is relatively simple in structure and economical in manufacture and assembly because of the non-undercut configuration of the outer joint element cavity and/or the ball track grooves in the outer joint element. The construction of the outer joint element enables this element to be fabricated by relatively inexpensive manufacturing processes. Forming of the outer joint element of two components as disclosed herein permits compensation of manufacturing tolerances by suitable positioning or dimensioning of the two components of the outer joint element.

It will be understood that this invention is susceptible to modification in order to adapt it to different usages and conditions, and accordingly, it is desired to comprehend such modifications within this invention as may fall within the scope of appended claims.

What is claimed is:

1. A constant velocity universal joint comprising an outer joint element having a cavity therein with a surface and a plurality of grooves in meridial planes in said cavity surface, an inner joint element within said cavity having a spherical outer surface and having a plurality of grooves in meridial planes in said outer surface corresponding in number to said outer joint element grooves to define pairs of opposed grooves, a plurality of balls between said joint elements with each ball being in a pair of opposed grooves, means between said joint elements for retaining said balls and having a first spherical surface on its outer face and a second spherical surface on its inner face, said cavity surface of said outer joint element co-acting with said ball retaining means first spherical surface and said inner joint element spherical outer surface co-acting with said ball retaining means second spherical surface to retain said balls in a plane which bisects the angle between the joint elements, said cavity surface having a non-undercut configuration in an axial direction with respect to one end of said outer joint element, and means on said one end of said outer joint element for maintaining said ball retaining means in co-acting relationship with said cavity surface.

2. A constant velocity universal joint as claimed in claim 1 wherein said cavity surface has a spherical portion co-acting with said retaining means first spherical surface.

3. A constant velocity universal joint as claimed in claim 2 wherein said maintaining means has a supporting surface thereon complementary to said cavity spherical surface portion.

4. A constant velocity universal joint as claimed in claim 3 and means co-acting with said supporting surface and being an extension of said retaining means for guiding said ball retaining means in co-acting relationship with said cavity spherical surface portion.

5. A constant velocity universal joint as claimed in claim 3 wherein said outer joint element is cylindrical and said spherical surface portion is at the other end of said cylindrical element.

6. A constant velocity universal joint as claimed in claim 5 wherein said guiding means comprises an end element attached to said one end of said cylindrical element to define a closed end of said outer joint elements.

7. A constant velocity universal joint as claimed in claim 6 wherein said supporting surface is on said end element.

8. A constant velocity universal joint as claimed in claim 7 wherein said supporting surface is resilient.

9. A constant velocity universal joint as claimed in claim 7 wherein said supporting surface comprises a synthetic plastic material.

10. A constant velocity universal joint as claimed in claim 7 wherein said supporting surface comprises a disc mounted in said end element.

11. A constant velocity universal joint as claimed in claim 9 wherein said plastic surface is formed in situ after assembly of said outer joint element.

12. A constant velocity universal joint as claimed in claim 3 wherein said supporting surface comprises a concave member having an annular flange about its periphery attached to said outer joint member, and a tubular power transmitting shaft connected to said one end of said outer joint element.

13. A constant velocity universal joint as claimed as claim 2 wherein said maintaining means comprises an annular member connected to said outer joint element and engageable with said ball retaining means.

14. A constant velocity universal joint as claimed in claim 6 wherein said maintaining means comprises an annular member having a peripheral edge clamped between said cylindrical element and said end element and engageable with said ball retaining means.

15. A constant velocity universal joint as claimed in claim 1 wherein said outer joint element grooves have a non-undercut configuration in an axial direction with respect to the other end of said outer joint element.

* * * * *